July 15, 1969  N. HOGLUND  3,455,206
APPARATUS FOR ROTATABLY SUPPORTING AND MOVING
A WORKPIECE RELATIVE TO A FIXED TOOL
Filed July 27, 1967  8 Sheets-Sheet 1

INVENTOR.
NILS HOGLUND
BY
William A. Zalesak
Attorney

July 15, 1969

N. HOGLUND 3,455,206

APPARATUS FOR ROTATABLY SUPPORTING AND MOVING
A WORKPIECE RELATIVE TO A FIXED TOOL

Filed July 27, 1967

INVENTOR.
NILS HOGLUND
BY
William A. Zalesak
Attorney

3,455,206
Patented July 15, 1969

1

3,455,206
APPARATUS FOR ROTATABLY SUPPORTING AND MOVING A WORKPIECE RELATIVE TO A FIXED TOOL
Nils Hoglund, Short Hills, N.J., assignor to Hoglund Engineering and Manufacturing Company, Inc., Berkeley Heights, N.J.
Filed July 27, 1967, Ser. No. 660,864
Int. Cl. B23c *1/18;* B24b *7/04*
U.S. Cl. 90—13.9                              5 Claims

ABSTRACT OF THE DISCLOSURE

The apparatus is intended primarily for very accurately forming contours on workpieces by milling or grinding. The workpiece is rotatably supported during forming operations and the workpiece is moved laterally or axially with respect to a tool mounted in a fixed position. A slidable housing carries a rotatable shaft carrying a work holder and a contour cam. The housing also slidably supports a ratio cam slide having a ratio cam and a follower engaged by said contour cam. The ratio cam cooperates with a fixed follower mounted on the base which slidably supports the housing.

Background of the invention

While moving workpieces relative to fixed tools is not new, it has been almost impossible to accurately form by milling or grinding contours of odd shapes to within a few hundredths of a thousandth of an inch. Previous attempts have resulted in intricate and complicated mechanisms. It is believed that my approach to this problem is entirely novel.

Summary of the invention

Apparatus made according to my invention includes a base having a roller bar upon which a housing is slidably mounted. The housing carries a driven shaft having thereon a contour cam and a workpiece holder. A ratio cam slide is mounted on the housing and has mounted thereon a ratio slide and a follower. The follower contacts the contour cam. A fixed follower is mounted on the roller bar and contacts said ratio cam. Fluid pressure operated biasing cylinders provide the biasing forces for keeping the cams and followers in contact. As the shaft rotates the workpiece rotates. The contour cam causes the housing to move in the desired direction with respect to the fixed tool.

2

Description of the preferred embodiments

Figure 1:
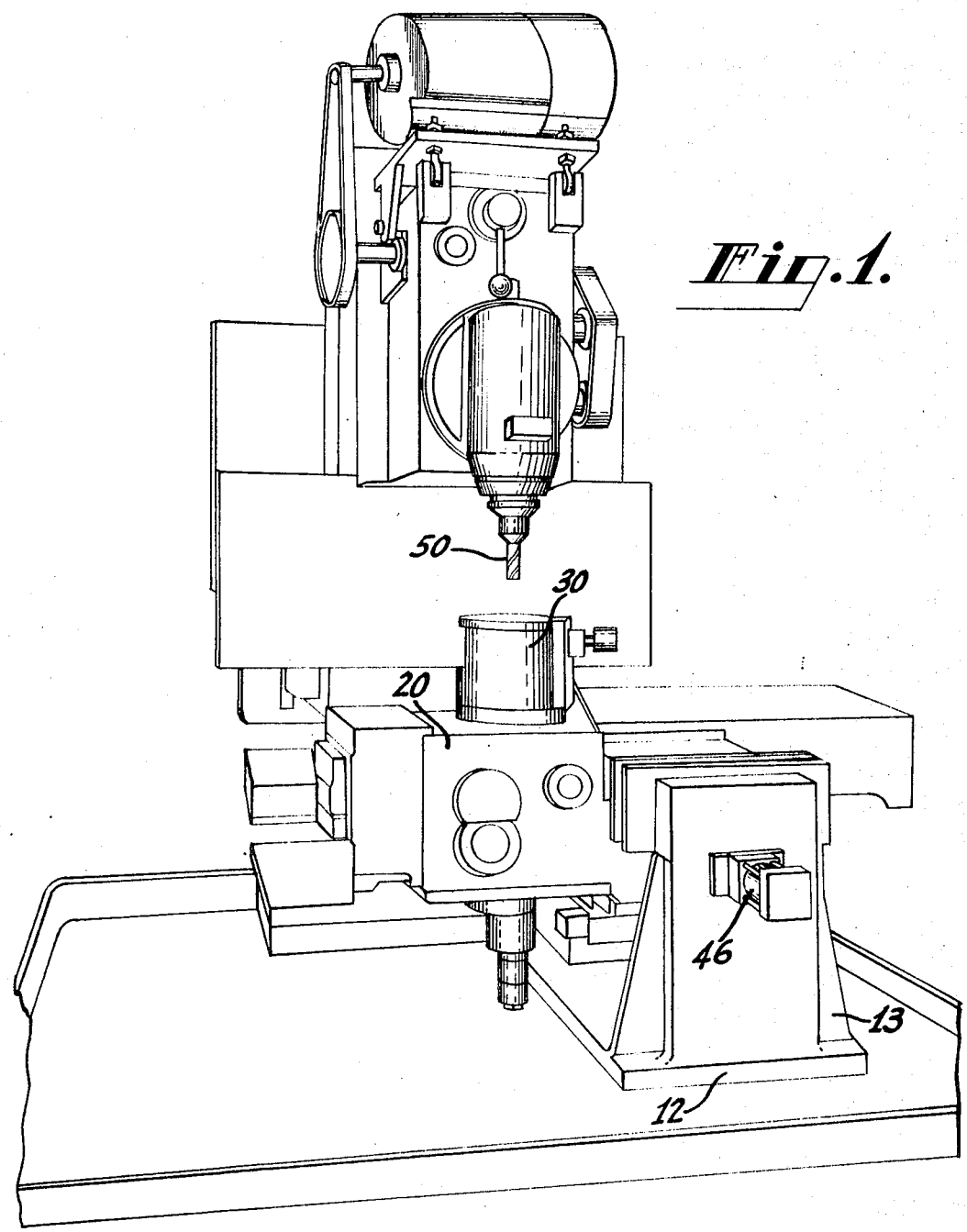
FIGURE 1 shows a front perspective of apparatus incorporating my invention.
Figure 2:
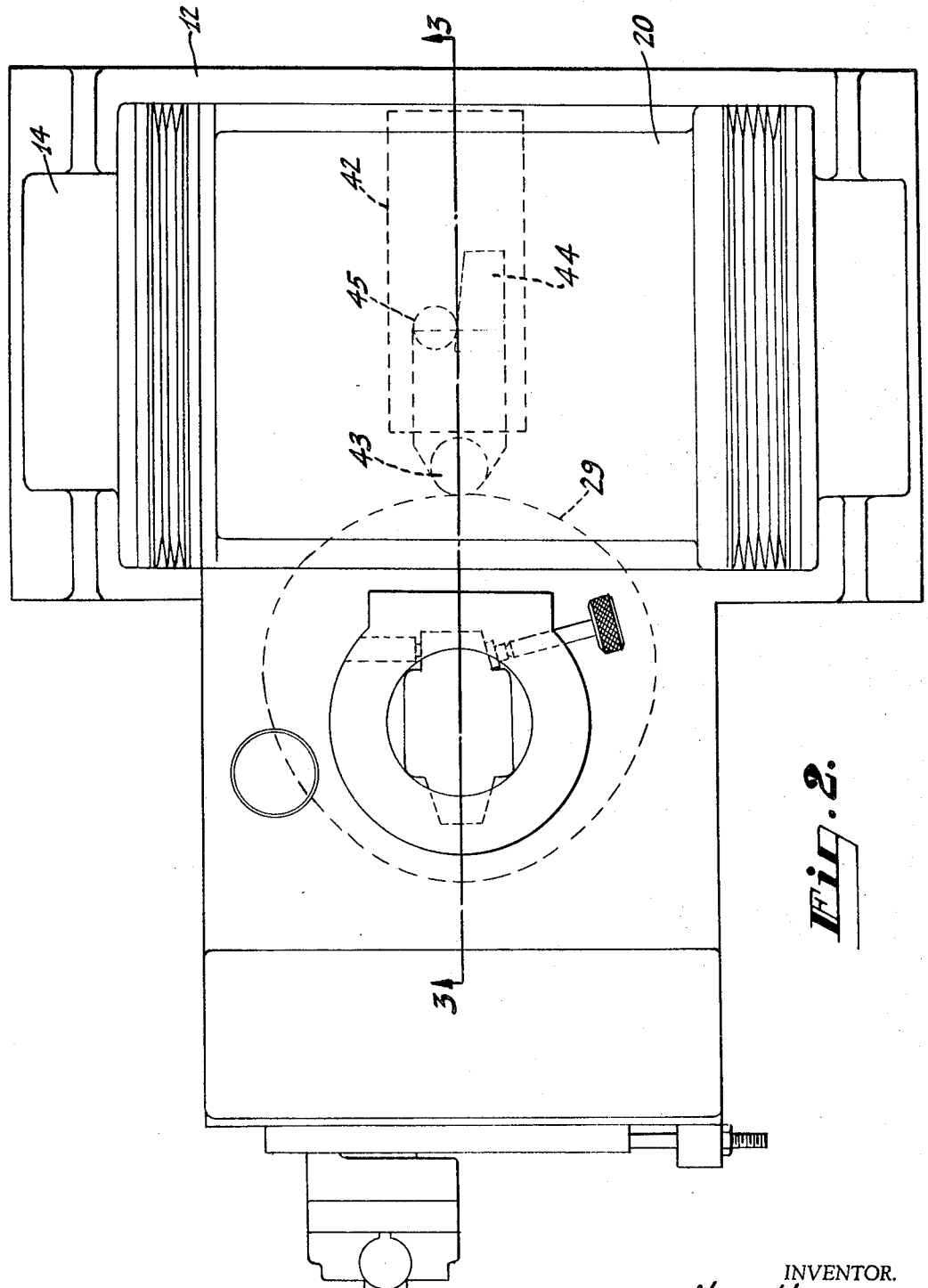
FIGURE 2 is a plan view of the apparatus shown in FIGURE 1.
Figure 3:
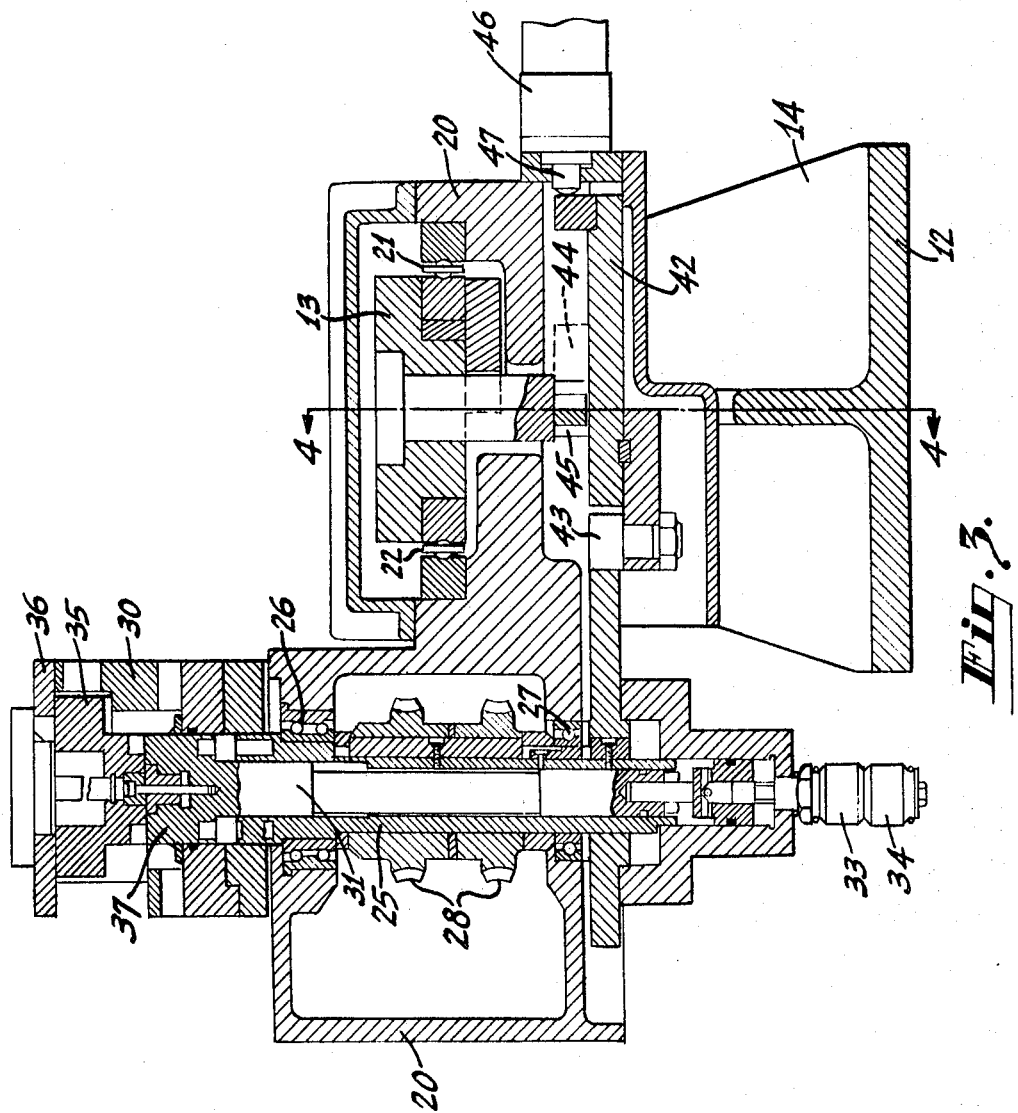
FIGURE 3 is a vertical section taken along the line 3—3 of FIGURE 2.
Figure 4:
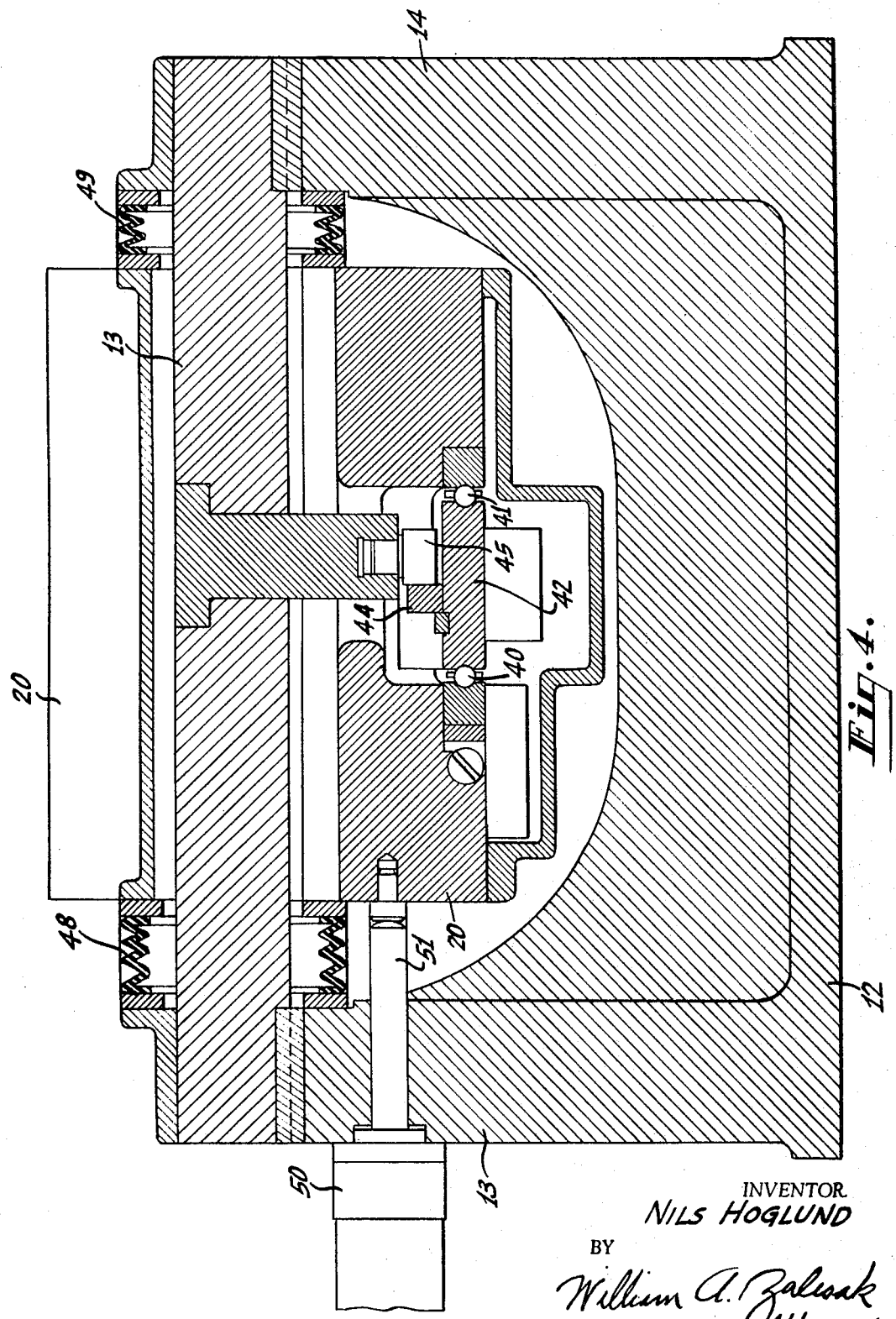
FIGURE 4 is a section taken along the line 4—4 of FIGURE 3.

Referring to FIGURES 1 to 4, inclusive, apparatus made according to my invention includes the base 12 having a roller bar 13 supported on the base 12 by supporting standards 14 and 15. Slidably supported on the roller bar 13 is the housing 20 by means of ball bearing assemblies 21 and 22.

The housing is moved in a manner to be described for moving a work piece rotatably mounted on a shaft in the housing in a predetermined path with respect to a cutting tool mounted in a fixed position. The mechanism for determining the movement of the housing includes a contour cam mounted on the shaft, a slide carrying a ratio cam and followers on the slide and base support.

The shaft 25 is rotatably mounted by means of the bearing assemblies 26 and 27. The shaft is power driven through a back lash gear mechanism 28 (described in my U.S. Patent No. 3,277,735). Secured to shaft 28 is the contour cam 29. Also mounted on the shaft 25 is the work holding fixture 30 cooperating with a clamping mechanism. Mounted within the hollow shaft 25 is a piston mechanism including the piston rod 31 attached to piston 32, and operated by means of fluid pressure devices (not shown) connected to couplings 33 and 34. The workpiece 35 is clamped between the plate 36 and clamping member 37 mounted on piston rod 31. Thus contour cam 29 and workpiece 35 rotate together.

To control extremely accurate movement of the housing and workpiece, I provide a ratio slide in the housing 20, having a follower cooperating with the contour cam and a ratio cam cooperating with a follower fixed on the roller bar.

Slidably supported in the housing 20 by means of bearing assemblies 40 and 41 is ratio slide 42. Secured to the slide 42 is the follower 43 in contact with contour cam 29. Attached to the other side of the slide is the ratio cam 44. A follower 45 fixed to the bearing bar 13 is in contact with ratio cam 44. A fluid pressure operated biasing cylinder 46 has a piston 47 in contact with the ratio slide 42 urging the slide to the left (FIGURE 3), thus maintaining cam 44 and follower 45 in contact.

Bellows type dust shields 48, 49 are connected between the housing 20 and the supporting standards 15 and 14.

A second fluid pressure operated cylinder 50 is provided with a piston 51 contacting the housing 20 for biasing cam 44 and stationary follower 45 in contact.

The milling tool 52 may be moved from its inoperative position to its cutting position by a vertically movable support (FIGURE 1), but remains in its fixed cutting position during cutting operations although it is possible to feed the cutting tool into the work.

Overall operation

After the workpiece 35 is clamped between plate 36 and member 37, power for rotating the shaft 25 is applied through gears 28. This rotates the workpiece and the contour cam 29. The ratio slide 42 moves back and forth aaginst the biasing cylinder 46. Ratio cam 44 engages the fixed follower 45 causing the housing 20 to move at very small increments in accordance with the shape of the contour on the contour cam 29. The contour cam can be made very large and very accurately and the contour shape reduced through the ratio cam to very minute and accurate movement of the housing and rotating workpiece to produce the highly accurate contour desired.

Figure 5:
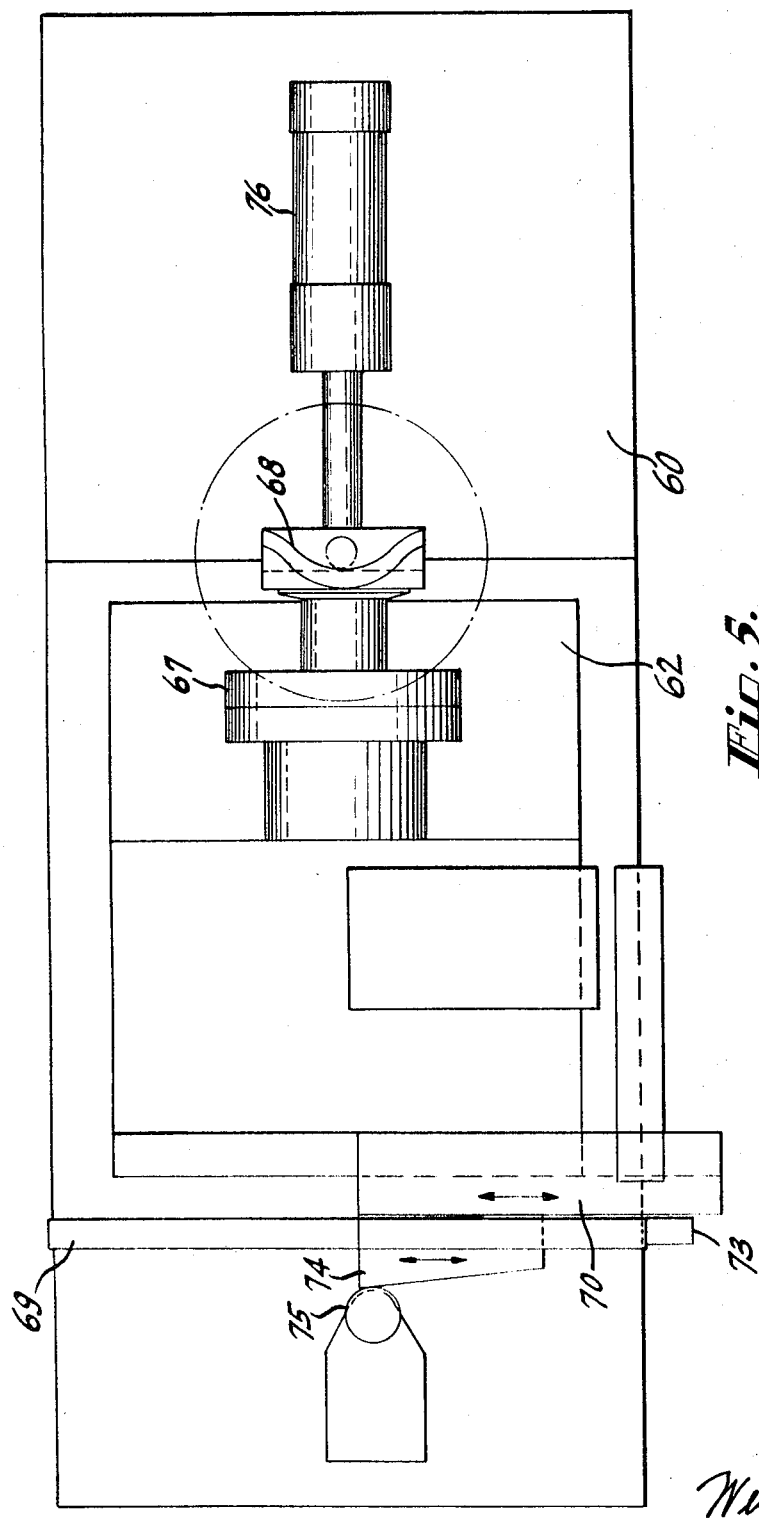
FIGURE 5 is a schematic plan view of a modification of the apparatus shown in FIGURES 1 to 4, inclusive.
Figure 6:
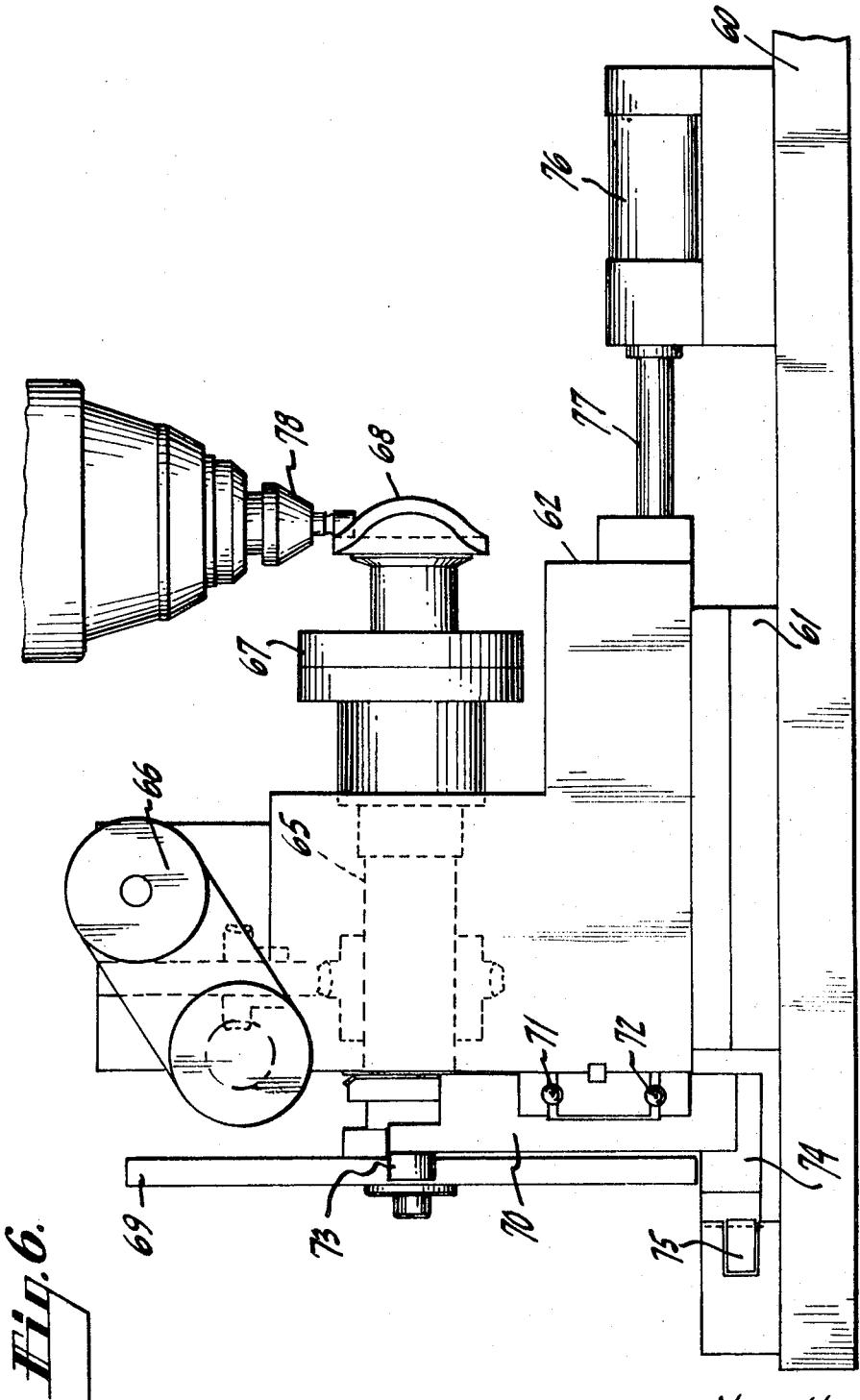
FIGURE 6 is a schematic side elevation of FIGURE 5.
Figure 7:
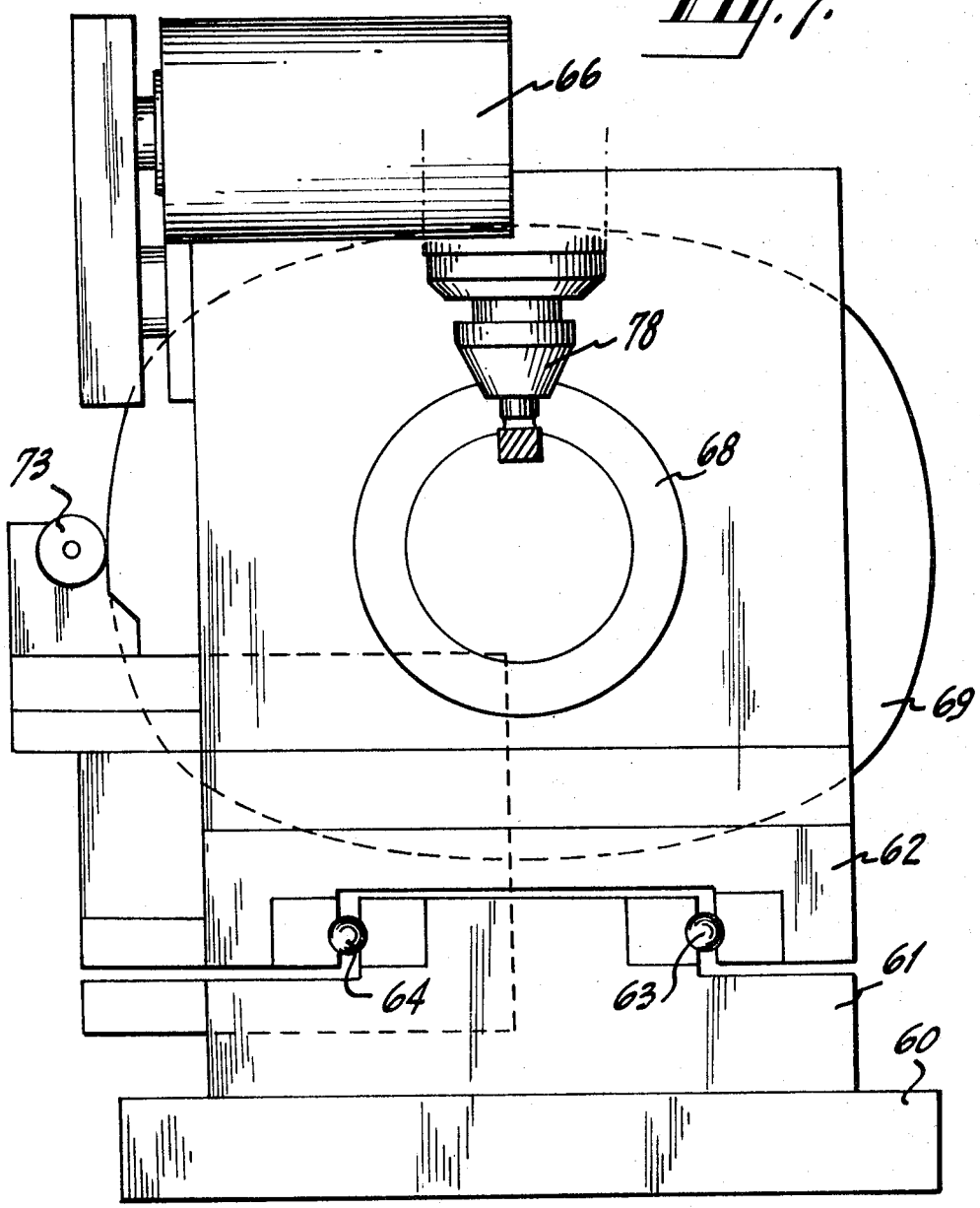
FIGURE 7 is a schematic right end view of FIGURE 6.
Figure 8:
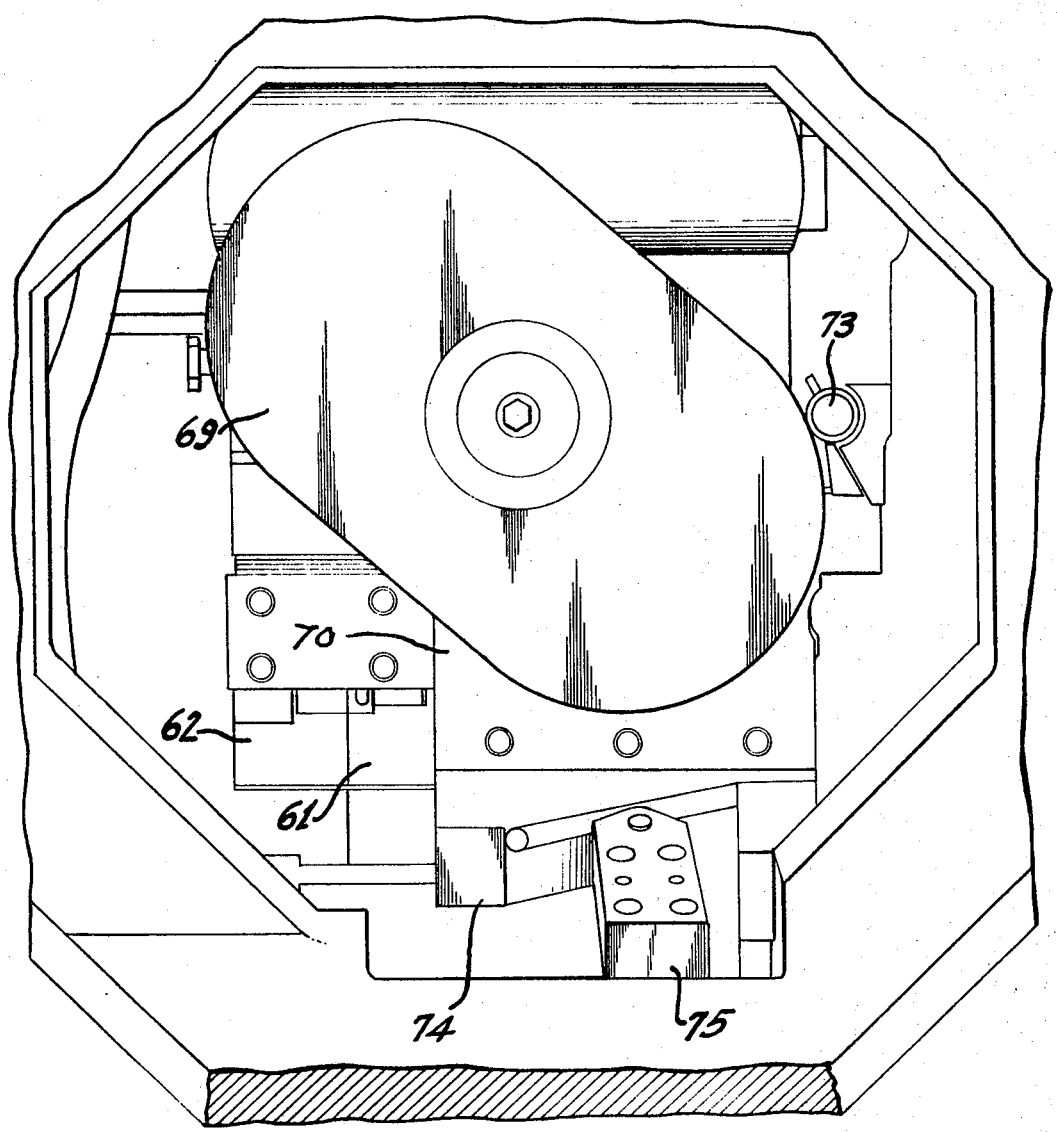
FIGURE 8 is an end perspective of the apparatus shown in FIGURES 5 to 7 as actually incorporated in the apparatus.

In the modification shown in FIGURES 5 to 8, the workpiece is rotated and advanced axially of its rotation instead of laterally. However, in this case the cutting tool also has a fixed forming or cutting position.

Mounted on a base 60 is a fixture base or slide guide 61 upon which the housing 62 is slidably mounted by means of ball bearing assemblies 63 and 64.

The housing 62 rotatably supports the shaft 65 geared to the drive motor 66. Mounted on one end of the shaft 65 is the work holder 67 rotatably supporting the workpiece 68. Fixed to the other end of shaft is the contour cam 69.

A ratio cam or cam follower slide 70 is slidably supported on housing 62 by means of the ball bearing assemblies 71 and 72. It is provided with the cam follower 73 in contact with the contour cam 69. The slide also has attached to it a ratio cam 74 in contact with the follower 75 fixed to the base 60. A fluid pressure cylinder 76 having a piston rod 77 is connected to the housing 62 providing the biasing action necessary to keep the cams and followers in contact.

As the shaft 65 rotates contour cam 69 causes the ratio slide 70 to move transversely the movement of the housing. As the ratio slide 70 moves, being in contact with the fixed follower 75, the housing 62 and workpiece 68 are moved transversely of the forming tool 78 to provide the desired contour on the workpiece 68.

The cams and followers on the housing and ratio slide can be transposed and perform their intended operations.

What is claimed is:

1. Apparatus for rotatably supporting and moving a workpiece relative to a fixed tool, said apparatus including:
   (1) a base,
   (2) a housing slidably mounted on said base,
   (3) a rotatably driven shaft mounted on said housing,
   (4) a contour cam mounted on said shaft,
   (5) a work holder mounted on said shaft,
   (6) a ratio cam slide on said housing,
   (7) a ratio cam on said cam slide,
   (8) a fixed follower on said base in contact with said ratio cam,
   (9) a follower on said cam slide contacting said contour cam,
   (10) and biasing means maintaining said cams and followers in contact.

2. Apparatus for rotatably supporting and moving a workpiece relative to a fixed tool, said apparatus including:
   (1) a base,
   (2) a housing slidably mounted on said base,
   (3) a rotatably driven shaft mounted on said housing,
   (4) a contour cam mounted on said shaft,
   (5) a work holder mounted on said shaft, said work holder including
   (6) a workpiece clamping plate mounted at one end of said shaft,
   (7) a piston and rod assembly within said shaft having a clamping element for engaging the workpiece,
   (8) a ratio cam slide on said housing,
   (9) a ratio cam on said slide,
   (10) a fixed follower on said base in contact with said ratio cam,
   (11) a follower on said cam slide contacting said contour cam,
   (12) and biasing means maintaining said cams and followers in contact.

3. Apparatus for rotatably supporting and moving a workpiece relative to a fixed tool, said apparatus including:
   (1) a base,
   (2) a roller bar on said base,
   (3) a housing slidably mounted on said bar,
   (4) a rotatably driven shaft mounted on said housing,
   (5) a contour cam mounted on said shaft,
   (6) a work holder mounted on said shaft,
   (7) a ratio cam slide on said housing,
   (8) a ratio cam mounted on one side of said slide,
   (9) a fixed follower on said bar in contact with said ratio cam,
   (10) a follower on the other side of said cam slide contacting said contour cam,
   (11) and biasing means contacting said ratio slide for maintaining said cams and followers in contact.

4. Apparatus for rotatably supporting and moving a workpiece relative to a fixed tool, said apparatus including:
   (1) a base,
   (2) a roller bar on said base,
   (3) a housing slidably mounted on said bar, said housing having a portion supporting
   (4) a rotatable driven shaft,
   (5) a contour cam mounted on said shaft,
   (6) a work holder mounted on said shaft,
   (7) a ratio cam slide in another portion of said housing,
   (8) a ratio cam mounted on said cam slide,
   (9) a fixed follower on said bar in contact with said ratio cam,
   (10) a follower on said cam slide contacting said contour cam,
   (11) and biasing means maintaining said cams and followers in contact.

5. Apparatus for rotatably supporting and moving a workpiece relative to a fixed tool, said apparatus including:
   (1) a base,
   (2) a housing slidably mounted on said base,
   (3) a rotatably driven shaft mounted on said housing, said housing being movable axially of said shaft,
   (4) a contour cam mounted on said shaft,
   (5) a work holder mounted on said shaft,
   (6) a ratio cam slide on said housing,
   (7) a ratio cam on said cam slide,
   (8) a fixed follower on said base in contact with said ratio cam,
   (9) a follower on said cam slide contacting said contour cam,
   (10) and biasing means maintaining said cams and followers in contact.

References Cited

UNITED STATES PATENTS

| | | | |
|---|---|---|---|
| 2,660,931 | 12/1953 | De Vlieg | 90—13.9 |
| 3,076,388 | 2/1963 | De Vlieg | 90—13 |
| 3,169,448 | 2/1965 | Hoglund | 90—13 |

GERALD A. DOST, Primary Examiner

U.S. Cl. X.R.

51—101